Feb. 28, 1933.   C. L. GOLDTRAP   1,899,614
RECORDING DEVICE FOR AIRPLANES
Filed Oct. 10, 1929   3 Sheets-Sheet 1
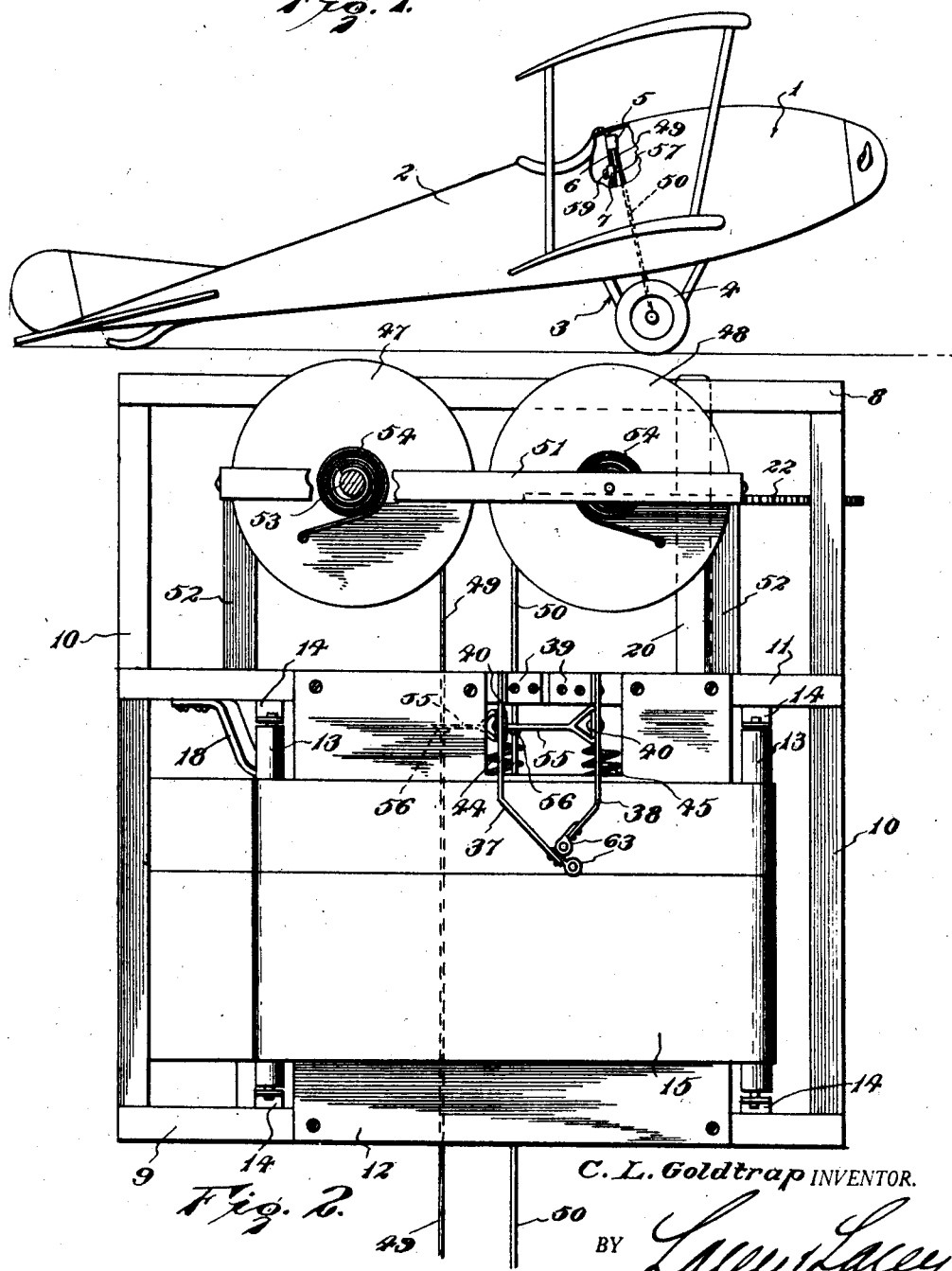
C. L. Goldtrap INVENTOR.
BY
ATTORNEYS Feb. 28, 1933.  C. L. GOLDTRAP  1,899,614
RECORDING DEVICE FOR AIRPLANES
Filed Oct. 10, 1929  3 Sheets-Sheet 2
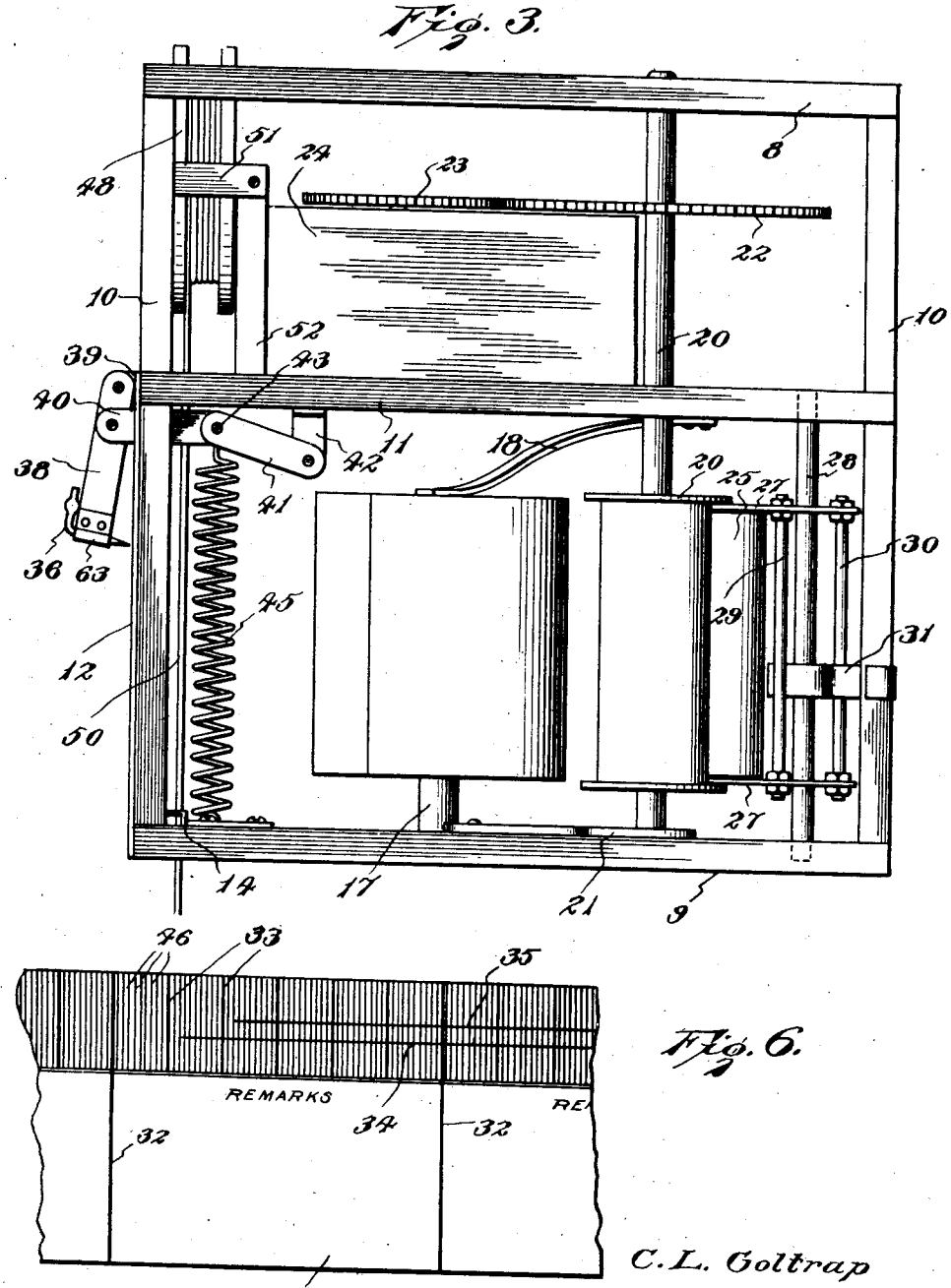
C. L. Goltrap
INVENTOR.
BY *Lacey & Lacey*
ATTORNEYS Feb. 28, 1933.  C. L. GOLDTRAP  1,899,614
RECORDING DEVICE FOR AIRPLANES
Filed Oct. 10, 1929   3 Sheets-Sheet 3
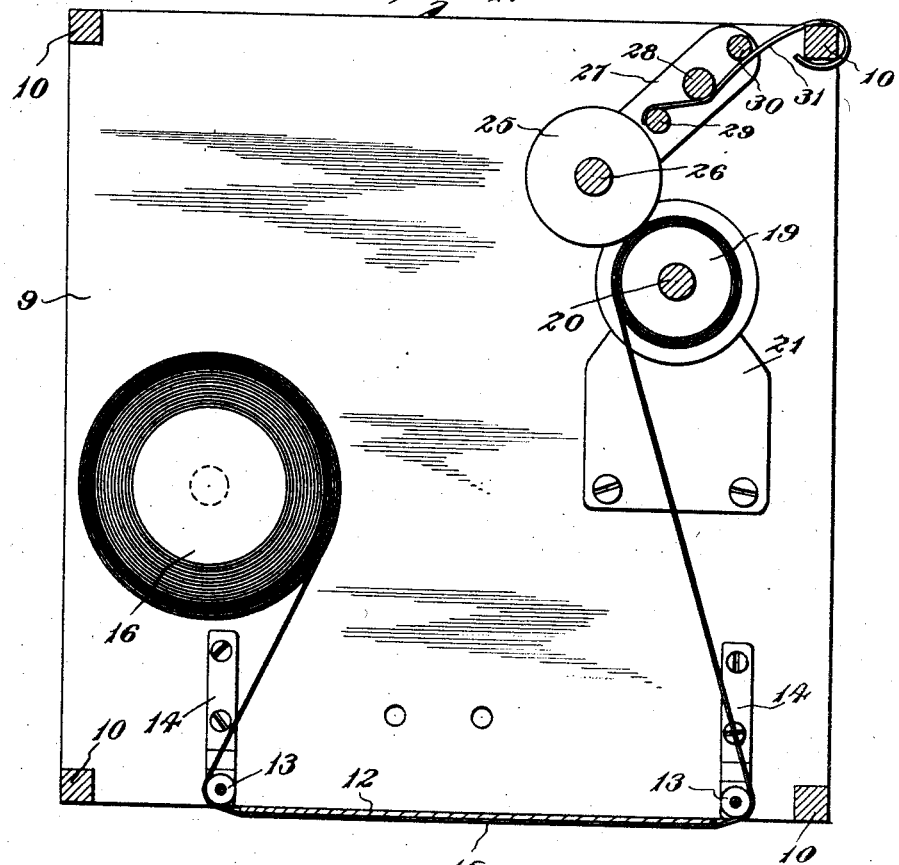
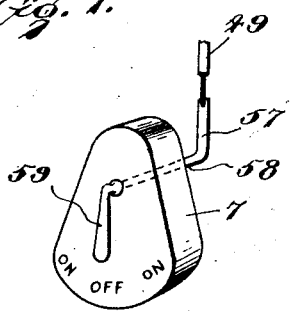
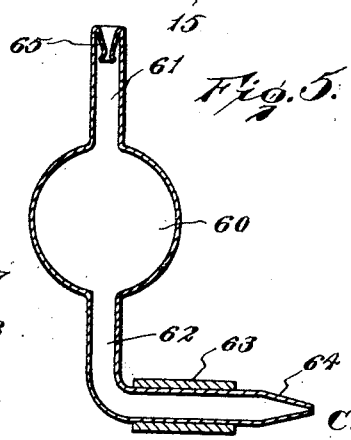
C. L. Goldtrap
INVENTOR.
BY
*Lacey & Lacey,*
ATTORNEY.

Patented Feb. 28, 1933

1,899,614

UNITED STATES PATENT OFFICE

CHARLEY L. GOLDTRAP, OF PHOENIX, ARIZONA

RECORDING DEVICE FOR AIRPLANES

Application filed October 10, 1929. Serial No. 398,784.

This invention relates to recording devices and more particularly to a device adapted to be applied to an airplane and by means of which the length of time the motor of the airplane has been running may be accurately recorded and also the time elapsed during a flight.

When an airplane is in operation the motor is started while the airplane is resting upon the ground or water if it happens to be a hydroplane, and the machine taxied across the ground or water until sufficient speed has been attained for a take-off. As a general rule the motor is continuously running until a landing is made and then shut off. When testing a newly assembled airplane and particularly a new type of plane it is desired to ascertain the length of run required for a take-off and in many cases it is desired to accurately determine the actual time an airplane has been in the air and the length of time the motor has been running.

Therefore, one object of this invention is to provide a recorder which may be applied to an airplane of a conventional construction and which will serve to accurately record the time a motor has been in operation and also the exact length of time the airplane has been in the air.

Another object of the invention is to so construct the recorder that markers may be held out of contact with a moving ribbon when the motor is shut off and the plane resting upon the ground or water and one moved into contact with the ribbon when the contact switch of the motor is turned on and the other moved into contact with the ribbon as soon as the wheels or equivalent landing gear leave the ground. By this arrangement the device will accurately record the length of time the motor has been running and the elapsed time during a flight and if the motor is shut off during a flight and the airplane allowed to glide this will also be recorded. This is important as it is often desirable to know the length of time an airplane has been gliding during a flight and in addition it would positively show whether the motor was shut off by a student demonstrating his ability to glide safely to a landing with the motor dead.

Another object of the invention is to provide a device of this character which is simple in construction and not liable to get out of order.

The invention is illustrated in the accompanying drawings, wherein,

Figure 1 is a view showing a conventional form of airplane in side elevation with the recorder applied thereto, Figure 2 is a front elevation of the improved recorder, Figure 3 is a view showing the recorder in side elevation, Figure 4 is a sectional view taken horizontally through the recorder, Figure 5 is an enlarged sectional view through one of the markers, Figure 6 is a view showing a fragment of the ribbon, and Figure 7 is a perspective view of the engine switch showing the manner in which it is connected with a line controlling one of the markers.

The airplane which has been shown in Figure 1 and indicated in general by the numeral 1 represents an airplane of a conventional construction including a fuselage 2, and landing gear 3, the wheels 4 of which rest upon the ground and are adapted to have downward movement away from the fuselage to a limited extent when the airplane leaves the ground. The recorder 5 is mounted so that it may be read through the instrument board 6 and includes markers connected with the engine switch 7 and landing gear so that when the engine is started one of the markers will be moved into contact with a moving ribbon to record the length of time the engine has been in operation and the other marker drawn into engagement with the ribbon by the landing gear moving downwardly away from the fuselage when the airplane leaves the ground and thereby record the length of time the airplane has been in flight.

The recorder includes a housing or frame having a top 8, a bottom 9 and corner posts 10 which extend between the top and bottom and intermediate the top and bottom there is provided a plaform or partition 11. At the front of the frame is disposed a sheet 12 which may be formed of metal or thin wood and constitutes a writing board. At opposite sides of this board are provided guide rollers 13 disposed vertically and at their upper and lower ends rotatably mounted in bearing brackets 14 secured against the bottom 9 and under surface of the partition 11 by screws or equivalent fastening means, as shown in Figure 4. The board 12 constitutes a firm backing for the paper record ribbon 15 which extends across the board and is guided by the rollers. The paper strip or ribbon 15 is originally wound upon a spool 16 to be rotatably mounted in the frame upon a spindle 17 and a leaf spring 18 is provided to bear against the upper end of the spool and prevent it from slipping off of the spindle while at the same time allowing it to be removed and a new one set in place. After the spool has been set in place upon the spindle the paper strip or tape is extended across the writing board 12 in engagement with the guide rollers 13 and is then engaged with a spool 19 carried by a shaft 20 which extends vertically through the frame with its lower end seated in a bearing bracket 21. Adjacent its upper end the shaft 20 carries a gear 22 which meshes with the gear 23 of a spring motor indicated in general by the numeral 24 and supported upon the platform or partition 11. The spring motor has not been illustrated in detail as it may be of any specific construction desired. A pressure roller 25 is provided to bear against the spool 19 and cause the ribbon to be smoothly wound thereon and this roller 25 is rotatably mounted upon a stem or spindle 26 carried by upper and lower strips 27 which fit loosely about a shaft 28 and are connected by rods 29 and 30 at opposite sides of the shaft. A spring strip 31 extends across the shaft 28 and rod 30 with one end engaged with the rod 29 and its other end engaged about the adjacent corner posts 10 and this spring serves to hold the roller in engagement with the spool 19 so that it will apply the desired pressure to the paper strip or ribbon and cause it to be wound smoothly upon the spool. By this arrangement the ribbon or record strip will be unwound from the spool 16 and drawn across the writing board and wound upon the spool 19 when the shaft 20 is rotated by the spring motor and in view of the fact that this spring motor is preferably of the clockwork type and the record strip is divided into main sections by lines 32 and auxiliary sections by lines 33 which may be further subdivided as shown in Figure 6, the length of time an engine has been running and an airplane in flight, may be accurately determined.

In order to mark lines 34 and 35 upon the ribbon to indicate respectively the length of time the motor has been running and the length of time the airplane has been in flight there has been provided markers 36 carried by arms 37 and 38 which are disposed vertically in front of the writing board and at their upper ends are pivoted to brackets 39 fixed against the forward edge face of the platform 11. Links 40 which are pivoted to the arms 37 and 38 extend rearwardly therefrom and companion links 41 are pivotally mounted at their inner ends upon brackets 42 carried by the platform 11. These links 41 project forwardly and have their forward ends pivoted to the rear ends of the links 40 by pins 43 to which are engaged the upper ends of springs 44 and 45. By this arrangement the springs which have their lower ends secured to the bottom 9 will tend to draw the links 40 and 41 downwardly and retain the markers in engagement with the outer surface of the record ribbon and cause the lines 34 and 35 to be marked as the ribbon is drawn across the writing board. The ribbon moves at such a rate of speed that a lapse of one hour is necessary for a marker to form a line from one of the lines 32 to another and since the lines 33 designate ten minute intervals and the spaces between these lines 33 are further divided by lighter lines 46 indicating minute divisions between the lines 33, the length of the lines 34 and 35 will accurately indicate the time the motor has been running and the time elapsed during a flight.

In order to prevent the markers from having contact with the strip or ribbon when the motor is shut off or the airplane resting upon the ground there has been provided drums 47 and 48 upon which are wound cords or flexible wires 49 and 50. These drums are rotatably mounted in a frame 51 supported above the platform by legs or standards 52 and about the axle 53 of each drum is disposed a coil spring 54 of greater strength than the springs 44 and 45. Each spring has one end fixed to the axle about which it is disposed and its outer end anchored to the spool and from an inspection of Figure 2 it will be readily seen that when the lines 49 and 50 which pass downwardly through the frame of the recorder are drawn upon and then afterwards released they will be rewound upon the spool. Side arms 55 project from the links 40 and have their free ends formed with openings through which the cords 49 and 50 pass and each cord is knotted or otherwise provided with an abutment 56 beneath the side arm through which it passes. By this arrangement the abutments will engage the side arms as the cords are rewound and the links 40 and 41 will be drawn upwardly against the action of the springs 44 and 45 thereby causing the arms 37 and 38 to be swung outwardly and dispose the markers out of contact with the record strip. The pull line 49 has its lower end secured to an arm 57 provided at one end of the shaft or actuating stem 58 of the switch 7 and from an inspection of Figure 7 it will be readily seen that when this shaft or stem 58 is turned in either direction by its handle 59 to close the switch and start the engine the line 49 will be drawn upon and unwound from the spool 47. Therefore, its abutment will be drawn downwardly and the spring 44 may contract to swing the links of the arm 37 downwardly and draw the arm 37 inwardly to dispose the marker carried thereby in contact with the record strip. In this way the length of time the motor is running will be indicated by the line 34 marked upon the record strip. As soon as the switch is shut off the pull upon the line 49 is continued and the line will be rewound upon the drum 47 thereby causing the abutment to again engage the side arm through which the line passes and cause the links to be drawn upwardly against the action of the spring 44 and move the marker out of engagement with the record strip. In the same way the length of time an airplane is off the ground will be indicated due to the fact that the pull line 50 is secured at its lower end to the landing gear and when the airplane is resting upon the ground the marker carried by the arm 38 will be out of contact with the record strip. As soon as the airplane leaves the ground the weight of the movable portion of the landing gear causes it to drop downwardly to its limit of downward movement, and as it moves downwardly it draws upon the line 50 to move its abutment downwardly from the side arm to which this line passes. Therefore, the spring 45 connected with the links of the arm 38 may contract and swing them downwardly to draw the arms toward the record strip and the line 35 will be marked upon the record strip. Therefore, this device will accurately indicate both the length of time an airplane has been in flight and also the length of time the motor has been running. Since the markers carried by the arms 37 will be moved out of engagement with the record strip whenever the motor is shut off a break in this line 34 will indicate that the motor was shut off during a flight and the plane allowed to glide during a portion of a flight.

Each of the markers is preferably formed as shown in Figure 5 and referring to this figure it will be seen that the marker which is preferably formed of glass consists of a bulb or reservoir 60 having filling neck 61 leading from one end thereof and a shank or neck 62 leading from its other end. The shank 62 fits through a sleeve 63 at the lower end of the arm to which the marker is attached and is formed with a tapered end 64 having a very small outlet opening provided therein. The opening is too small to allow the ink to flow out of the marker except when it is in contact with the record strip and therefore ink will not leak through this end of the marker when out of contact with the strip. In order to prevent the ink from spilling out of the filling neck 61 when looping or executing other movements when in flight, the free end portion of the neck 61 is turned inwardly as shown at 65 and if so desired this portion 65 may be formed upon a removable cap so that the supply of ink may be quickly replenished when necessary.

Having thus described the invention, I claim:

1. In combination with an airplane having landing gear movable towards and away from its fuselage, a recorder including a record strip, a marker movable towards and away from said strip, means to move the marker into contact with said strip, means to move the marker out of contact with said strip rendered inoperative when the landing gear is out of contact with the ground, and means for imparting movement to said strip whereby the marker will form lines upon the strip when in contact therewith.

2. A recorder comprising a frame, a record strip, means for moving said strip longitudinally, an arm carried by said frame and movable towards and away from said strip, marker carried by said arm to contact with the strip and form a line thereon as the strip moves, links pivoted to the arm and frame, a spring connected to the frame and links and adapted to draw upon the links and move the arm towards the strip, a side arm for said links, a line having an abutment to engage said side arm, and spring actuated means of greater strength than said spring adapted to draw upon said line and move the abutment thereof into engagement with the side arm and move the marker into contact with said strip.

3. A recorder comprising a frame, a record strip, means for moving said strip longitudinally, an arm carried by said frame and movable towards and away from said strip, a marker carried by said arm to contact with the strip and form a line thereon as the strip moves, links pivoted to the arm and frame, a side arm for said links, a drum rotatably mounted, a pull line wound upon said drum and extending therefrom for connection with an actuating element, an abutment upon said line to engage said side arm, a spring to rotate said drum and rewind said pull line to engage the abutment thereof with the side arm and move the marker away from said strip, and a spring engaged with said links to move the marker into contact with said strip when the pull line is drawn upon to move its contact out of engagement with the side arm.

4. A recorder comprising a frame, a record strip, means for moving said strip longitudinally, an arm carried by said frame and movable towards and away from said strip, a marker carried by said arm to contact with the strip and form a line thereon as the strip moves, links pivoted to the arm and frame, spring connected to the frame and links and adapted to draw upon the links and move the arm towards the strip, a side arm for said links, a drum rotatably mounted above said links, a pull line wound upon said drum and extending therefrom through said side arm and provided with an abutment beneath the side arm, and a spring to rotate the drum and wind the pull line thereon to move the abutment into engagement with the side arm to swing the links and move the marker out of contact with said strip in opposition to action of the first mentioned spring.

5. A recorder comprising a frame, a roll of record tape rotatably mounted in said frame, a shaft rotatably mounted in said frame, a spool carried by said shaft, the tape being engaged about said spool, means to rotate said shaft to wind the tape upon the spool, an arm pivoted to the frame for movement towards and away from a portion of the tape, a marker carried by said arm, toggle links pivoted to each other and to the frame and arm, a side arm extending from one link, a spring to move the links downwardly and draw the arm inwardly to dispose the marker in contact with said tape, a drum, a line wound upon the drum and having an abutment to engage said side arm and a spring to rotate the drum in a direction to wind the line upon the drum.

6. In combination with an airplane having landing gear movable towards and away from the fuselage, a recorder including a movable record receiving member, a marker, operative yielding means normally urging the marker towards said member to make a record thereon, superior yielding means holding the operative yielding means in restraint and the marker away from the member, and controlling means operatively connected with the landing gear and actuated by the movement of said landing gear for voiding the restraining action of the superior yielding means to permit action of the operative yielding means.

7. In combination with an airplane, a recorder including a movable record receiving member, a marker, operative yielding means normally urging the marker towards said member to make a record thereon, superior yielding means holding the operative yielding means in restraint and the marker away from the member, and a pull line operatively connected with the superior yielding means and a movable part of the airplane and actuated by the movement of said movable part for voiding the restraining action of the superior yielding means to permit action of the operative yielding means.

In testimony whereof I affix my signature.

CHARLEY L. GOLDTRAP. [L. S.]